US012671517B2

(12) United States Patent
Shew et al.

(10) Patent No.: US 12,671,517 B2
(45) Date of Patent: Jun. 30, 2026

(54) BONDING OVER SUB-CARRIER MULTIPLEXED CHANNELS

(71) Applicant: Ciena Corporation, Hanover, MD (US)

(72) Inventors: Stephen Daniel Shew, Ottawa (CA); Sebastien Gareau, Ottawa (CA)

(73) Assignee: Ciena Corporation, Hanover, MD (US)

( * ) Notice: Subject to any disclaimer, the term of this patent is extended or adjusted under 35 U.S.C. 154(b) by 296 days.

(21) Appl. No.: 18/418,591

(22) Filed: Jan. 22, 2024

(65) Prior Publication Data

US 2025/0023655 A1      Jan. 16, 2025

Related U.S. Application Data

(60) Provisional application No. 63/512,818, filed on Jul. 10, 2023.

(51) Int. Cl.
*H04J 14/02*      (2006.01)
(52) U.S. Cl.
CPC ...... *H04J 14/0264* (2013.01); *H04J 14/0232* (2013.01); *H04J 14/0267* (2013.01)
(58) Field of Classification Search
None
See application file for complete search history.

(56) References Cited

U.S. PATENT DOCUMENTS

| | | | |
|---|---|---|---|
| 6,530,032 | B1 | 3/2003 | Shew et al. |
| 8,116,232 | B2 | 2/2012 | Skalecki et al. |

| | | | |
|---|---|---|---|
| 8,300,625 | B2 | 10/2012 | Shew et al. |
| 8,509,618 | B2 | 8/2013 | Boertjes et al. |
| 8,560,697 | B2 | 10/2013 | Aubin et al. |
| 8,718,471 | B2 | 5/2014 | Prakash et al. |
| 8,867,913 | B2 | 10/2014 | Gareau et al. |
| 9,083,484 | B2 | 7/2015 | Boertjes et al. |
| 9,106,446 | B1 | 8/2015 | Aubin et al. |
| 9,264,139 | B2 | 2/2016 | Young et al. |
| 9,432,144 | B2 | 8/2016 | Gareau et al. |
| 9,648,402 | B2 | 5/2017 | Clarke et al. |
| 10,135,760 | B2 | 11/2018 | Gareau |
| 10,193,688 | B2 | 1/2019 | Gareau et al. |

(Continued)

OTHER PUBLICATIONS

Welch et al., "Point-to-Multipoint Optical Networks Using Coherent Digital Subcarriers", Aug. 15, 2021, Journal of Lightwave Technology, vol. 39, No. 16, pp. 5232-5247 (Year: 2021).*

(Continued)

*Primary Examiner* — David W Lambert
(74) *Attorney, Agent, or Firm* — Baratta Law PLLC; Lawrence A. Baratta, Jr.

(57) ABSTRACT

A sub-carrier multiplexing (SCM) system include a digital layer including circuitry configured to interface with a client via a client signal and to interface with a media layer via a plurality of constituent signals, that together comprise the client signal; and the media layer including sub-carrier multiplexing (SCM) with each sub-carrier configured to carry one of the plurality of constituent signals. The client signal can be an Ethernet signal, Optical Transport Network (OTN) signal, etc., and the plurality of constituent signals can be Flexible Ethernet (FlexE) layer signals, Flexible OTN (FlexO) layer signals, Metro Transport Network (MTN) layer signals, ZR layer signals, etc.

11 Claims, 8 Drawing Sheets

(56)                References Cited

U.S. PATENT DOCUMENTS

| | | | |
|---|---|---|---|
| 10,218,823 B2 | 2/2019 | Gareau |
| 10,225,037 B2 | 3/2019 | Gareau |
| 10,256,909 B2 | 4/2019 | Gareau et al. |
| 10,382,167 B2 | 8/2019 | Gareau et al. |
| 10,396,972 B1 | 8/2019 | Gareau et al. |
| 10,397,088 B2 | 8/2019 | Gareau |
| 10,425,153 B2 | 9/2019 | Holness et al. |
| 10,425,177 B2 | 9/2019 | Gareau et al. |
| 10,567,352 B2 | 2/2020 | Gareau et al. |
| 10,594,395 B2 | 3/2020 | Abdullah et al. |
| 10,637,604 B2 | 4/2020 | Gareau et al. |
| 10,750,260 B1 | 8/2020 | Gareau et al. |
| 10,868,662 B2 | 12/2020 | Gareau et al. |
| 11,038,610 B2 | 6/2021 | Gareau et al. |
| 11,184,112 B1 | 11/2021 | Gareau et al. |
| 11,277,217 B2 | 3/2022 | Gareau et al. |
| 11,552,722 B2 | 1/2023 | Gareau et al. |
| 11,620,528 B2 | 4/2023 | Ryan et al. |
| 11,646,864 B2 | 5/2023 | Perras et al. |
| 11,658,737 B2 | 5/2023 | Gareau et al. |
| 11,695,494 B2 | 7/2023 | McCarthy et al. |
| 2005/0102418 A1 | 5/2005 | Shew et al. |
| 2006/0259630 A1 | 11/2006 | Shew et al. |
| 2007/0230505 A1 | 10/2007 | Roch et al. |
| 2015/0156059 A1 | 6/2015 | Shew et al. |
| 2017/0214467 A1 | 7/2017 | Djukic et al. |
| 2018/0102834 A1 | 4/2018 | Ibach et al. |
| 2018/0359133 A1 | 12/2018 | Shew et al. |
| 2020/0252350 A1 | 8/2020 | Gareau et al. |
| 2020/0358722 A1 | 11/2020 | Gareau et al. |
| 2020/0412471 A1 | 12/2020 | Gareau et al. |
| 2021/0076111 A1 | 3/2021 | Shew et al. |
| 2021/0194576 A1 | 6/2021 | Gareau |

OTHER PUBLICATIONS

Dave Welch et al., "Point-to-Multipoint Optical Networks Using Coherent Digital Subcarriers," Journal of Lightwave Technology, vol. 39, No. 16, Aug. 15, 2021, pp. 5232-5247.

Tobias A. Eriksson et al., "Point-to-Multipoint Networks Enabled by Digital Subcarrier Multiplexing," Advanced Photonics Congress 2022, NeM4E.1, Jul. 28, 2022. 2 pp.

Oct. 8, 2024, International Search Report and Written Opinion for International Patent Application No. PCT/US2024/037210.

* cited by examiner

*FIG. 5*

This is for OTN long-reach interface (G.709.3 (2020)).

*FIG. 6*

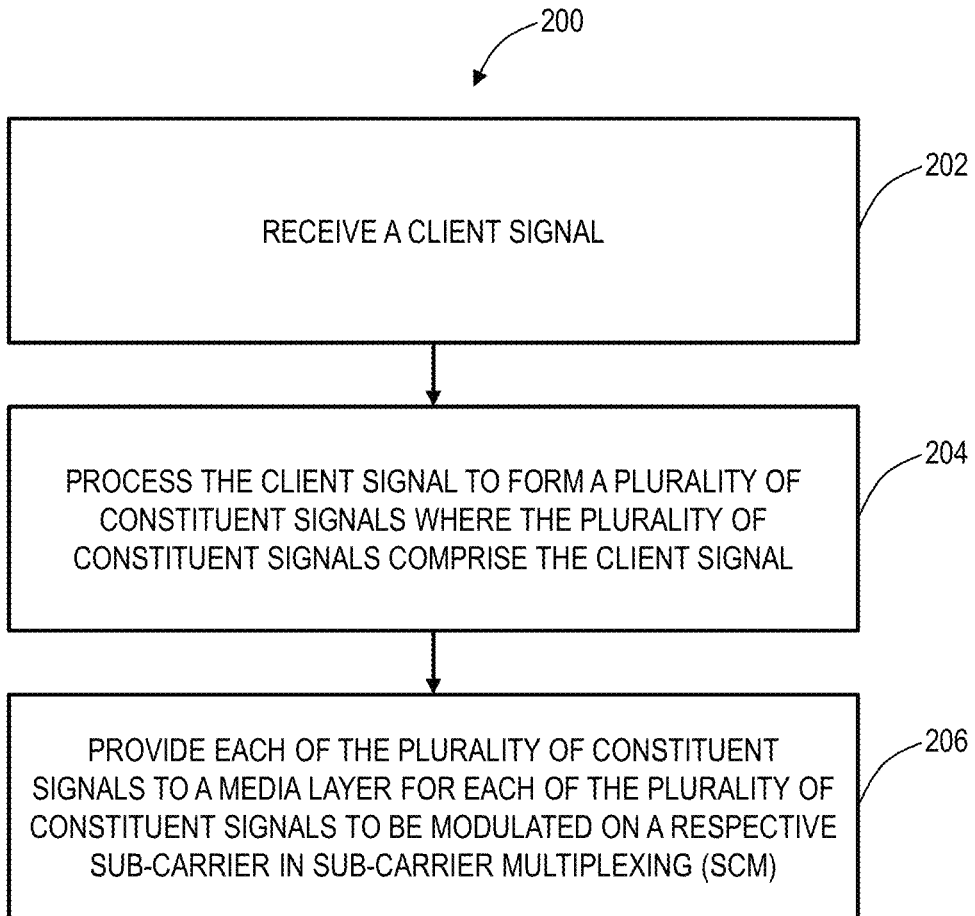

200

202

RECEIVE A CLIENT SIGNAL

204

PROCESS THE CLIENT SIGNAL TO FORM A PLURALITY OF CONSTITUENT SIGNALS WHERE THE PLURALITY OF CONSTITUENT SIGNALS COMPRISE THE CLIENT SIGNAL

206

PROVIDE EACH OF THE PLURALITY OF CONSTITUENT SIGNALS TO A MEDIA LAYER FOR EACH OF THE PLURALITY OF CONSTITUENT SIGNALS TO BE MODULATED ON A RESPECTIVE SUB-CARRIER IN SUB-CARRIER MULTIPLEXING (SCM)

*FIG. 7*

BONDING OVER SUB-CARRIER MULTIPLEXED CHANNELS

CROSS-REFERENCE TO RELATED APPLICATION(S)

The present disclosure claims priority to U.S. Provisional Patent Application No. 63/512,818, filed Jul. 10, 2023, the contents of which are incorporated by reference in their entirety.

FIELD OF THE DISCLOSURE

The present disclosure relates generally to networking and computing. More particularly, the present disclosure relates to systems and methods for bonding over sub-carrier multiplexed channels.

BACKGROUND OF THE DISCLOSURE

Sub-carrier multiplexing (SCM) is a technique for digitally combining multiple signals into one wider carrier signal. SCM with an optical carrier was described as early as in "Subcarrier multiplexing for multiple-access lightwave networks," JLT, Vol. 5, No. 8, 1987. Here SCM is the multiplexing of signals (the sub-carriers) in the frequency domain at frequencies well below that of the optical carrier. Each sub-carrier is individually modulated and those modulations can be different per sub-carrier in the digital (electrical) domain. The set of sub-carriers are then multiplexed into a wider digital signal then modulated into the optical domain to a single optical signal.

BRIEF SUMMARY OF THE DISCLOSURE

The present disclosure relates to systems and methods for bonding over sub-carrier multiplexed channels. This includes mapping of protocol slices/instances to sub-carriers where those slices are bonded in a higher Flexible Ethernet (FlexE) or Flexible Optical Transport Network (FlexO) client signal. This applies concepts of FlexO/FlexE used in traditional applications to point-to-multipoint (PtMP) and access applications. Currently, FlexO/FlexE are only used in point-to-point topologies and have not been used in PtMP topologies such as PON Optical Distribution Networks. The present disclosure also includes adding additional operations, administration, and maintenance (OAM) to the FlexE/FlexO protocol to enable additional functions in PtMP applications (e.g., resizing, group management). In an embodiment, the present disclosure includes applying a FlexO or FlexE bonding to sub-carrier multiplexed signals in point-to-multipoint optical topologies to provide a higher information rate (bits/s) using the aggregate sub-carrier bandwidth (GHz). SCM has applicability in future passive optical networks (PONs), metro networks, radio fronthaul, and the like. There is a need to support a combination of multiple sub-carriers into one larger signal.

In an embodiment, a transmit circuit is configured to receive a client signal, process the client signal to form a plurality of constituent signals where the plurality of constituent signals comprise the client signal, and provide each of the plurality of constituent signals to a media layer for each of the plurality of constituent signals to be modulated on a respective sub-carrier in sub-carrier multiplexing (SCM). The client signal can be one or more Ethernet signals and the plurality of constituent signals can be Flexible Ethernet (FlexE) layer signals. The client signal can be one or more Optical Transport Network (OTN) or Ethernet signals and the plurality of constituent signals can be Flexible OTN (FlexO) layer signals. The client signal can be one or more Ethernet signals and the plurality of constituent signals can be ZR layer signals. The client signal can be one or more Ethernet signals and the plurality of constituent signals can be Metro Transport Network (MTN) layer signals. The media layer can utilize copper where the plurality of constituent signals are provided to an intermediate frequency (IF) modulator in the media layer. The media layer can utilize fiber where the plurality of constituent signals are provided to a transmitter in the media layer. The media layer can be in a point-to-multipoint topology.

In another embodiment, a receive circuit is configured to receive a plurality of constituent signals from a media layer where each of the plurality of constituent signals are demodulated from a respective sub-carrier in sub-carrier multiplexing (SCM), process the plurality of constituent signals, which were aggregated together in the media layer, to form a client signal, and provide the client signal. The client signal can be one or more Ethernet signals and the plurality of constituent signals can be Flexible Ethernet (FlexE) layer signals. The client signal can be one or more Optical Transport Network (OTN) signals and the plurality of constituent signals can be Flexible OTN (FlexO) layer signals. The client signal can be one or more Ethernet signals and the plurality of constituent signals can be ZR layer signals. The client signal can be one or more Ethernet signals and the plurality of constituent signals can be Metro Transport Network (MTN) layer signals. The media layer can utilize copper where the plurality of constituent signals are each received from an intermediate frequency (IF) demodulator in the media layer. The media layer can utilize fiber where the plurality of constituent signals are received from a receiver in the media layer. The media layer can be in a point-to-multipoint topology.

In a further embodiment, a sub-carrier multiplexing (SCM) system includes a digital layer including circuitry configured to interface with a client and to interface with a media layer via a plurality of constituent signals, that together comprise the client signal; and the media layer including sub-carrier multiplexing (SCM) with each sub-carrier configured to carry one of the plurality of constituent signals. The client signal can be one of (1) one or more Ethernet signals and the plurality of lower rate signals are Flexible Ethernet (FlexE) layer signals, (2) one or more Optical Transport Network (OTN) or Ethernet signals and the plurality of lower rate signals are Flexible OTN (FlexO) layer signals, (3) one or more Ethernet signals and the plurality of constituent signals are ZR layer signals, and (4) one or more Ethernet signals and the plurality of constituent signals are Metro Transport Network (MTN) layer signals. The e media layer can utilize passive optical network (PON). The media layer can utilize one of copper where the plurality of constituent signals are provided to an intermediate frequency (IF) modulator in the media layer, and fiber where the plurality of constituent signals are provided to a transmitter in the media layer.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a diagram of FlexO with an example of an OTUC4 client supported over four FlexO-1-DO instances, aggregated together, and sent on separate sub-carriers.

FIG. 6 is a diagram comparing bonding in clause 143 of IEEE802.3-2022 with FlexE.

FIG. 7 is a flowchart of a transmit process for bonding over sub-carrier multiplexed channels.

DETAILED DESCRIPTION OF THE DISCLOSURE

The present disclosure relates to systems and methods for bonding over sub-carrier multiplexed channels.

Introduction

Again, SCM is a technique for combining multiple signals into one wider carrier signal. It has recently been proposed for use in point-to-multipoint optical networks in ITU-T SG15 such as Passive Optical Network (PON) systems addressing the edge of the network as well in metro aggregation networks. A stated requirement is for an Optical Network Unit (ONU) of which there are many in a point-to-multipoint (PtMP) topology, to be able to send/receive multiple sub-carriers so that it can benefit from the sum of the information rates supported by the bandwidth of those sub-carriers. The present disclosure describes two solutions for bonding of the information rates supported by the bandwidth of two or more sub-carriers to/from an ONU so that a single interface of larger bit rate at a digital layer can be used.

The two solutions use FlexO (ITU-T G.709.1, "Flexible OTN short-reach interfaces," Jun. 18, 2022, the contents of which are incorporated by reference in their entirety) for optical transport network (OTN) networks and FlexE (OIF FLEXE-02.2, Implementation Agreement, October 2021, the contents of which are incorporated by reference in their entirety) for Ethernet/Internet Protocol (IP)/packet networks.

Sub-Carrier Multiplexing (SCM)

Again, SCM with an optical carrier was described as early as in "Subcarrier multiplexing for multiple-access lightwave networks," JLT, Vol. 5, No. 8, 1987. Here SCM is the multiplexing of signals (the sub-carriers) in the frequency domain at frequencies well below that of the optical carrier. Each sub-carrier is individually modulated and those modulations can be different per sub-carrier in the digital (electrical) domain. The set of sub-carriers are then multiplexed into a wider digital signal then modulated into the optical domain to a single optical signal.

Figure 1:
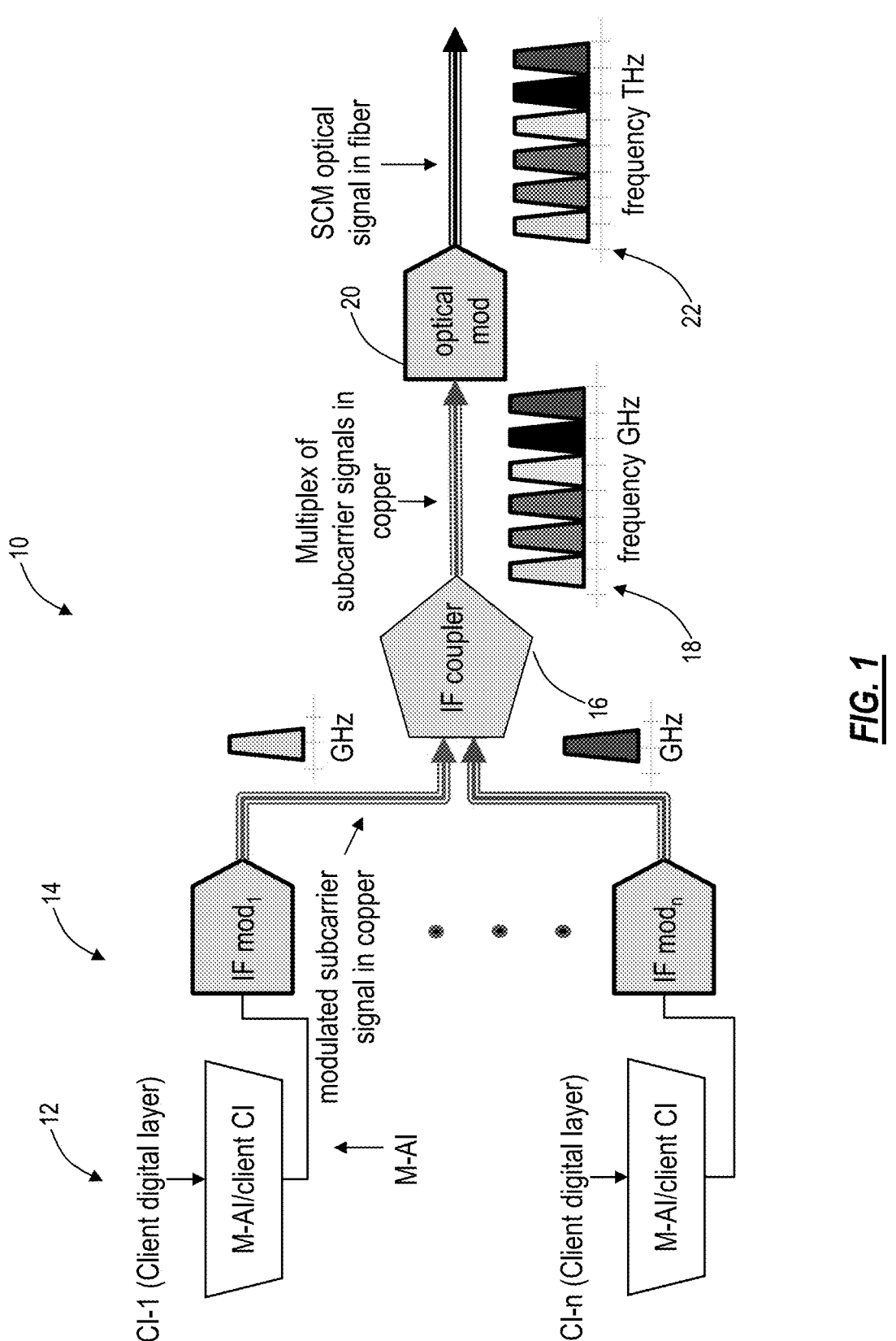
FIG. 1 is a network diagram of a network using ITU-T G.800 nomenclature for digital layers and ITU-T G.807 nomenclature for media (copper and fiber), for illustrating SCM.

FIG. 1 is a network diagram of a network 10 using G.800 nomenclature for digital layers and G.807 nomenclature for media (copper and fiber), for illustrating SCM. See ITU-T Recommendation G.800 Unified functional architecture of transport networks, Apr. 13, 2016, and ITU-T Recommendation G.807 Generic functional architecture of the optical media network, Feb. 7, 2020, the contents of each are incorporated by reference in their entirety.

FIG. 1 illustrates a unidirectional flow from left-to-right, where digital information 12 (G.800 Characteristic Information, or CI) is input to an adaptation function that adapts the CI to a format suitable for input to a modulation function 14. The adaptation function is labelled "M-AI/client CI", and the output is known as M-AI, for "media layer adapted information". There are n clients, CI-1 to CI-n, n is an integer, greater than 1. The modulation function 14 has the label "IF mod" and represents modulation of the M-AI into an intermediate frequency (hence "IF"), usually in GHz. The output of the modulation function 14 is a signal with encoded M-AI supported over a copper wire. In other words, an electromagnetic (EM) wave in a metallic conductor (waveguide).

Multiple such modulated signals each at a different frequency slot, are multiplexed together in an IF coupler 18 to form one wider signal 18, again transmitted over a copper wire. FIG. 1 shows a representation of multiple sub-carriers in the GHz frequency range. The multiplex of SCM signals is then modulated into the optical domain with an optical modulator 20 and is a SCM optical signal 22. The SCM optical signal 22 is in the THz frequency range.

Point-to-Multipoint Topology

A point-to-multipoint topology includes a root node and a plurality of leaf nodes. A PON is an example of a point-to-multipoint topology. In a PON, an Optical Line Terminal (OLT) is the root node, and there are multiple Optical Network Units (ONUs) for the leaf nodes (also referred to as leaves). ITU-T Recommendation G.987 10-Gigabit-capable passive optical network (XG-PON) systems: Definitions, abbreviations and acronyms, Jun. 13, 2012, the contents of which are incorporated by reference in their entirety, is an example of a PON architecture.

SCM in Point-to-Multipoint Topology

The SCM optical signal can propagate over an optical PtMP topology and is replicated at splitters. The leaves of the PtMP tree are receivers of the signal and encoded information. In ITU-T PON systems, the functions to receive the information are in ONUs. While the leaves/ONUs receive the entire SCM optical signal, only information in one or more sub-carriers is received by an individual leaf. The direction of signal propagation in FIG. 1 is conventionally known as "downstream" and the "upstream" direction is from the leaves/ONUs of the PtMP topology to the root.

Figure 2:
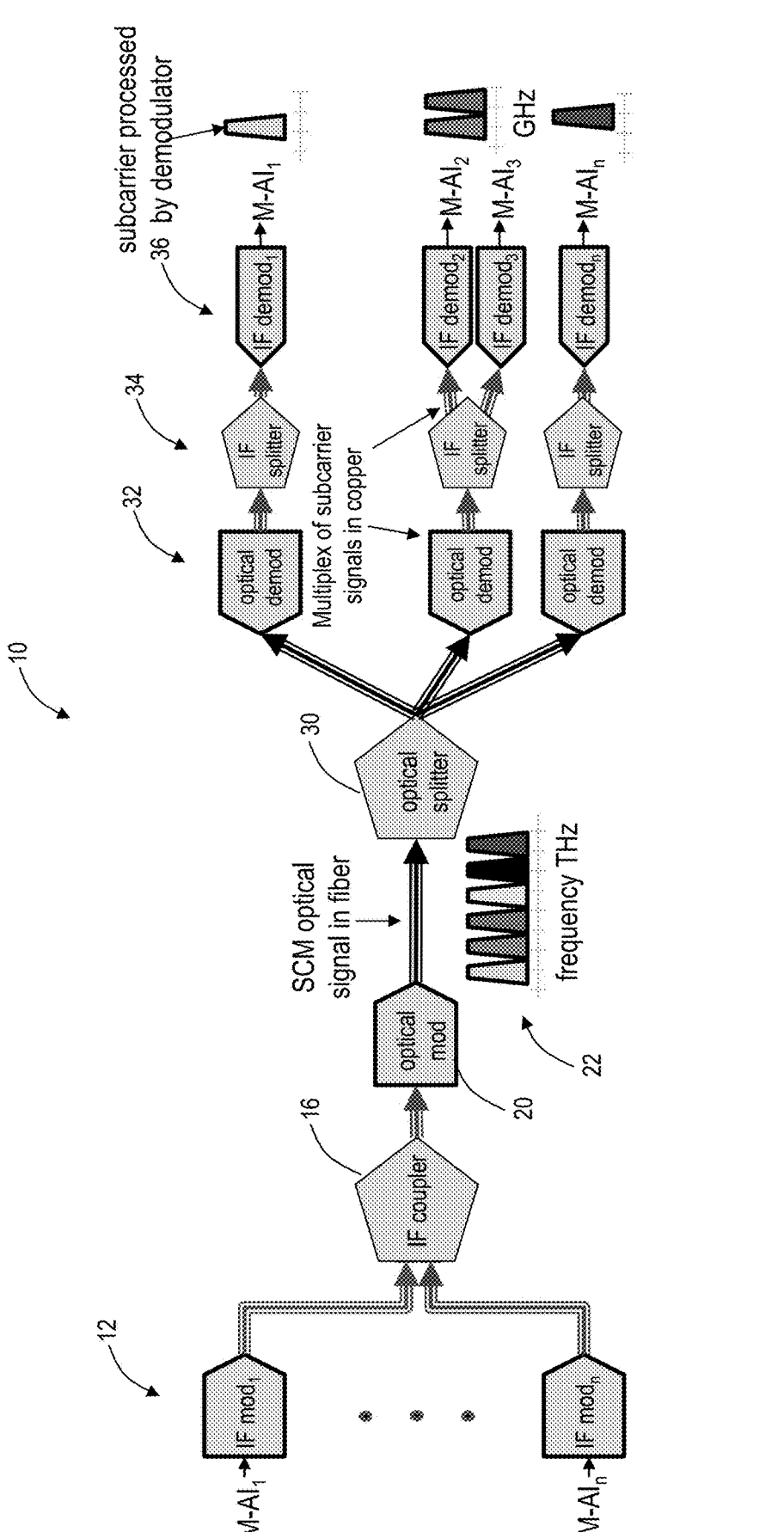
FIG. 2 is another network diagram of the network of FIG. 1, again using ITU-T G.800 nomenclature for digital layers and ITU-T G.807 nomenclature for media (copper and fiber), illustrating how information in the downstream is processed by a leaf in a PtMP topology.

FIG. 2 is another network diagram of the network 10, again using G.800 nomenclature for digital layers and G.807 nomenclature for media (copper and fiber), illustrating how information in the downstream is processed by a leaf. The SCM optical signal 22 is transmitted over a fiber to an optical splitter 30. The optical splitter 30 replicates the SCM optical signal, i.e., splits the SCM optical signal into multiple copies which are each is provided to an optical demodulator 32 which converts the SCM optical signal into an SCM electrical signal. Each of the optical demodulator 32 is configured to recover the multiplex of sub-carrier signals in the IF frequency domain, which is identical to that shown in FIG. 1 with the GHz frequency range as output from the IF coupler 16. This enters an IF splitter 34 that replicates the multiplex of sub-carrier signals if needed.

For illustration purposes, client 1 has only one sub-carrier, $M$-$AI_1$, and as there is only IF demodulator 36 "IF demod$_1$" in this case, splitting does not occur at the IF splitter 34. IF demod$_1$ demodulates information that was originally modulated using modulator "IF mod$_1$" and outputs the information labelled as "$M$-$AI_1$".

Further, for illustration purposes, clients 2, 3 want to be bonded together to form a larger, client signal. That is, the $M$-$AI_2$ and $M$-$AI_3$ are for the same user. In this case two sub-carriers are of interest and so the multiplex of sub-carrier signals is split by the IF splitter 34 and is input to "IF demod$_2$" and "IF demod$_3$". Each can demodulate a separate sub-carrier. Separate $M$-$AI$ are output from each IF demodulator. In this manner, the middle leaf can receive more information due to the potentially higher collective information rate, than the first leaf assuming each sub-carrier supports a similar information rate (e.g., 25 Gb/s).

In the direction of transmission from leaves to the root (upstream), a leaf would use an IF modulator 14 whose output enters an optical modulator. Outputs of all of the optical modulators from the leaves is then aggregated in an optical coupler (in place of the optical splitter 30 in the downstream direction). This forms the SCM optical signal 22 which is input to an optical demodulator (where optical modulator 22 is) that outputs the SCM signal 18 in the intermediate frequency. This SCM signal is replicated by an IF splitter (where the IF coupler 16 is) to a plurality of IF demodulators so that the $M$-$AI$ of each subcarrier is recovered.

Bonding Sub-Carriers

In various embodiments, the present disclosure addresses techniques for using sub-carriers together from a bonding function to support a larger, logical/client signal. For example, assuming each sub-carrier supports 25 Gb/s, the $M$-$AI_2$ and $M$-$AI_3$ are each 25 Gb/s, but the user wants 50 Gb/s. The present disclosure provides techniques for bonding the $M$-$AI_2$ and $M$-$AI_3$ together so that they can be transmitted as sub-carriers (at 25 Gb/s), but handed off at the desired, combined rate, 50 Gb/s.

As described herein, bonding refers to a process of supporting one client signal (e.g., see FIG. 4 which illustrates a 100GE client bonded onto a two 50G FlexE layer signals, and sent on separate sub-carriers) over multiple constituent signals. In the present disclosure, the singe interface is a client interface, such as the digital information 12. The client signal can be one or more Ethernet or OTN signals. The constituent signals are multiple signals that collectively comprise the client signal, i.e., the constituent signals are lower rate signals relative to the client signal. The constituent signals can be FlexE, FlexO, ZR, MTN, etc. The present disclosure uses SCM where each constituent signal can be modulated on a sub-carrier. Also, as described herein, aggregating refers to aspect that multiple sub-carriers are grouped together in the media layer to form the bonded client signal, which, in the media layer, is the aggregated constituent signals.

With SCM, in the case where more than one sub-carrier is to be demodulated from the output of a single optical demodulator ($M$-$AI_2$ and $M$-$AI_3$ in FIG. 2), information output from the IF demodulators 36 is still in distinct $M$-$AI$. It is desirable to aggregate the information rate in some use cases so that a higher bit rate is available to an end service. Again, for example, if each of $M$-$AI$ in FIG. 2 supported a 25 Gb/s rate, then a 50 Gb/s rate could be realized by using $M$-$AI_2$ and $M$-$AI_3$.

This disclosure describes the use of FlexO as a bonding technique for a TDM/OTN aggregated rate, and FlexE as a bonding technique for an Ethernet aggregated rate. FlexO can be used to output an Optical Transport Unit-Cn, where C means 100 for 100 Gb/s, and n=1, 2, 3, . . . , for 100 Gb/s, 200 Gb/s, 300 Gb/s, . . . ).

Figure 3:
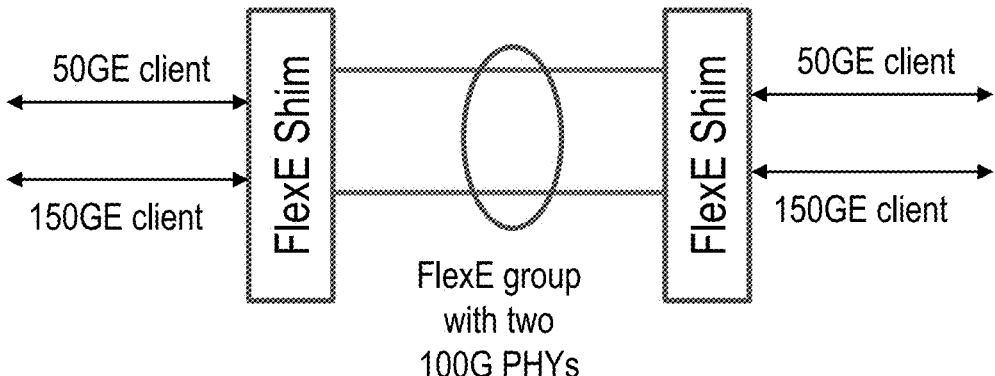
FIG. 3 is a network diagram of an example of FlexE bonding where two clients, one at 50G and one at 150G, are supported over a FlexE group.

FlexE can be used to output an Ethernet PHY, at various rates. FlexE is a bonding technique developed in the Optical Internetworking Forum (OIF) that enables multiple Ethernet PHYs at the same rate, to be bonded together. Clients of these bonded Ethernet PHYs can be subrates of the client signal rate. FIG. 3 is a network diagram of an example of FlexE bonding where two clients, one at 50G and one at 150G, are supported over a FlexE group. Note, the terms 50G means 50 Gb/s, and 50GE means a 50 Gigabit Ethernet (GE) client. In FlexE bonding, there is a FlexE Shim which interfaces the clients on one side, i.e., 50G and 150G, and interfaces a FlexE group with two bonding 100G PHYs, which conventionally are transmitted over individual fibers, wavelengths, etc.

In the present disclosure, rather than adapting FlexE to Ethernet PHYs over individual fibers, wavelengths, etc., FlexE is adapted to provide Ethernet PHYs over sub-carriers.

Figure 4:
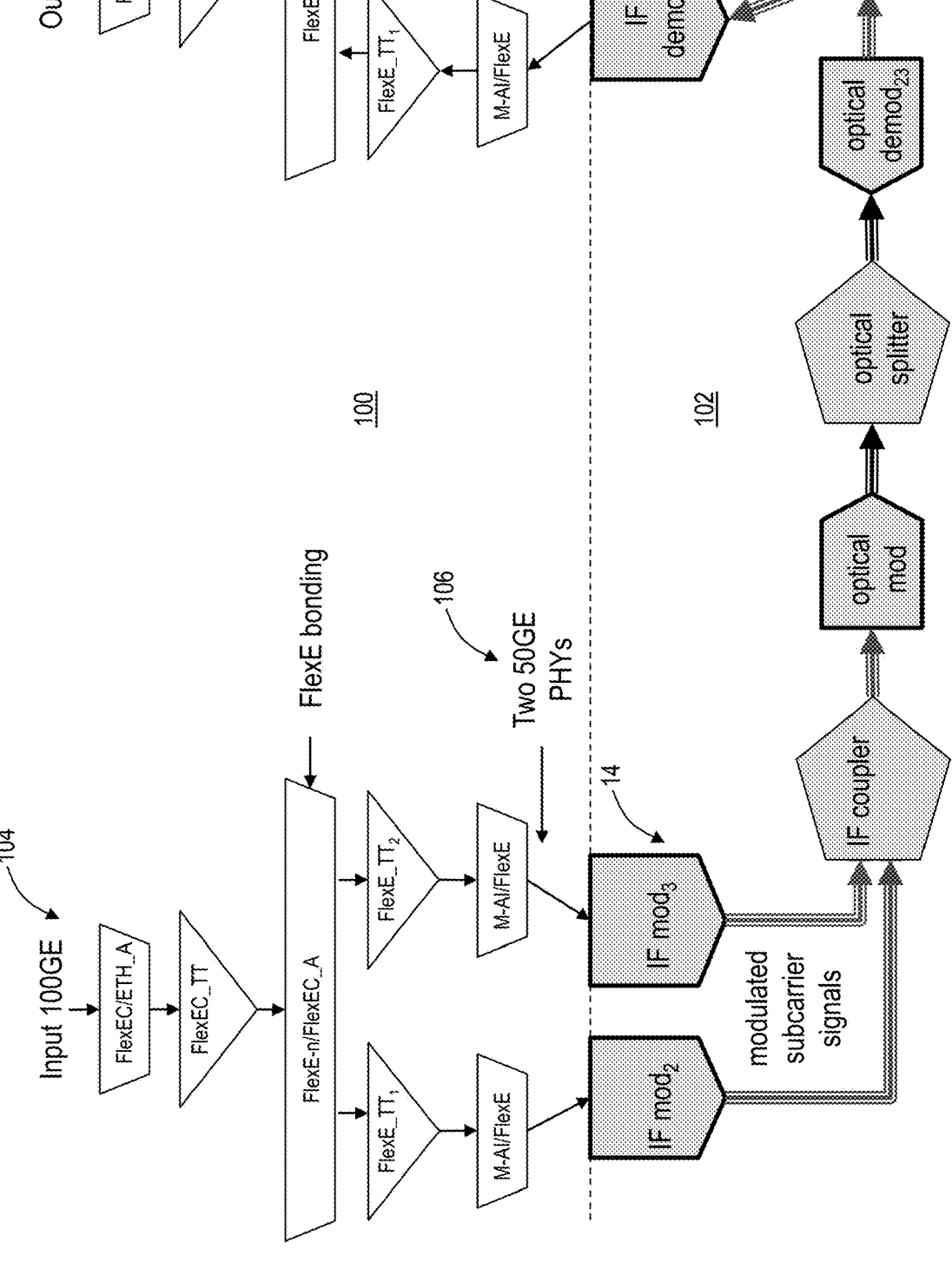
FIG. 4 is a diagram of a FlexE from G.8023 illustrating a 100GE client bonded onto two 50G FlexE layer signals, and sent on separate sub-carriers.

FIG. 4 is a diagram of a FlexE from G.8023 illustrating a 100GE client bonded onto a two 50G FlexE layer signals, and sent on separate sub-carriers. See ITU-T Recommendation G.8023 Characteristics of equipment functional blocks supporting Ethernet physical layer and Flex Ethernet interfaces, Jun. 6, 2018, the contents of which are incorporated by reference in their entirety. G.8023 specifies basic building blocks and a set of rules by which they may be combined in order to describe Ethernet physical layer and Flex Ethernet interfaces. The building blocks are based on atomic modelling functions and combination rules defined in Recommendation ITU-T G.806 Characteristics of transport equipment-Description methodology and generic functionality—Amendment 1, Nov. 13, 2022, the contents of which are incorporated by reference in their entirety.

In particular, FIG. 4 includes a digital layer 100 and a media layer 102. The digital layer 100 is where a large, aggregated client signal 104 is received, processed according to functions for FlexE bonding, e.g., G.8023, G.806, etc., and provided as multiple FlexE layer signals 106 to the media layer 102. Note, the digital layer 100 includes various circuits for processing the FlexE bonding functionality. The multiple FlexE layer signals 106 are modulated onto sub-carriers via the modulation function 14 in the media layer 102. Note, the media layer 102 can be as described in FIGS. 1 and 2. In this example, the 100GE client represents the bonding of the information rates of the two sub-carriers each supporting 50G.

Conversely, after the SCM transmission, the media layer 102 is configured to provide multiple $M$-$AIs$ to the digital layer 100, which bonds them back together to provide an output 100GE client 108. The FlexE bonding case supports packet flows.

Of note, the example of FIG. 4 includes the client signals 104, 108 at 100GE, two sub-carriers, each carrying two 50GE FlexE layer signals 106. This is shown for illustration purposes and those skilled in the art will appreciate other values are contemplated, including different GE rates and different numbers of sub-carriers and FlexE layer signals 106, i.e., more than two.

For a multiplexed TDM client, FlexO as defined in ITU-T G.709.1 and G.709.3 can be used to support an OTN client rate of n*100G (OTUCn, where n represents multiples of 100G). This is a TDM client. An example is the support an OTUC2 which is done by adapting the client to two FlexO-1 frames. Each FlexO-1 frame could then be supported by a 100G optical signal.

FlexO frames have the following different sizes:
FlexO-1—100G
FlexO-2—200G
FlexO-4—400G
FlexO-8—800G FlexO frames are generically denoted as FlexO-x. In the suite of ITU-T G.709 Recommendations, the syntax specifying FlexO-x also has an appended interface name string. Examples are "SC" for the staircase FEC and "DO" for the Open FEC.

Figure 5:
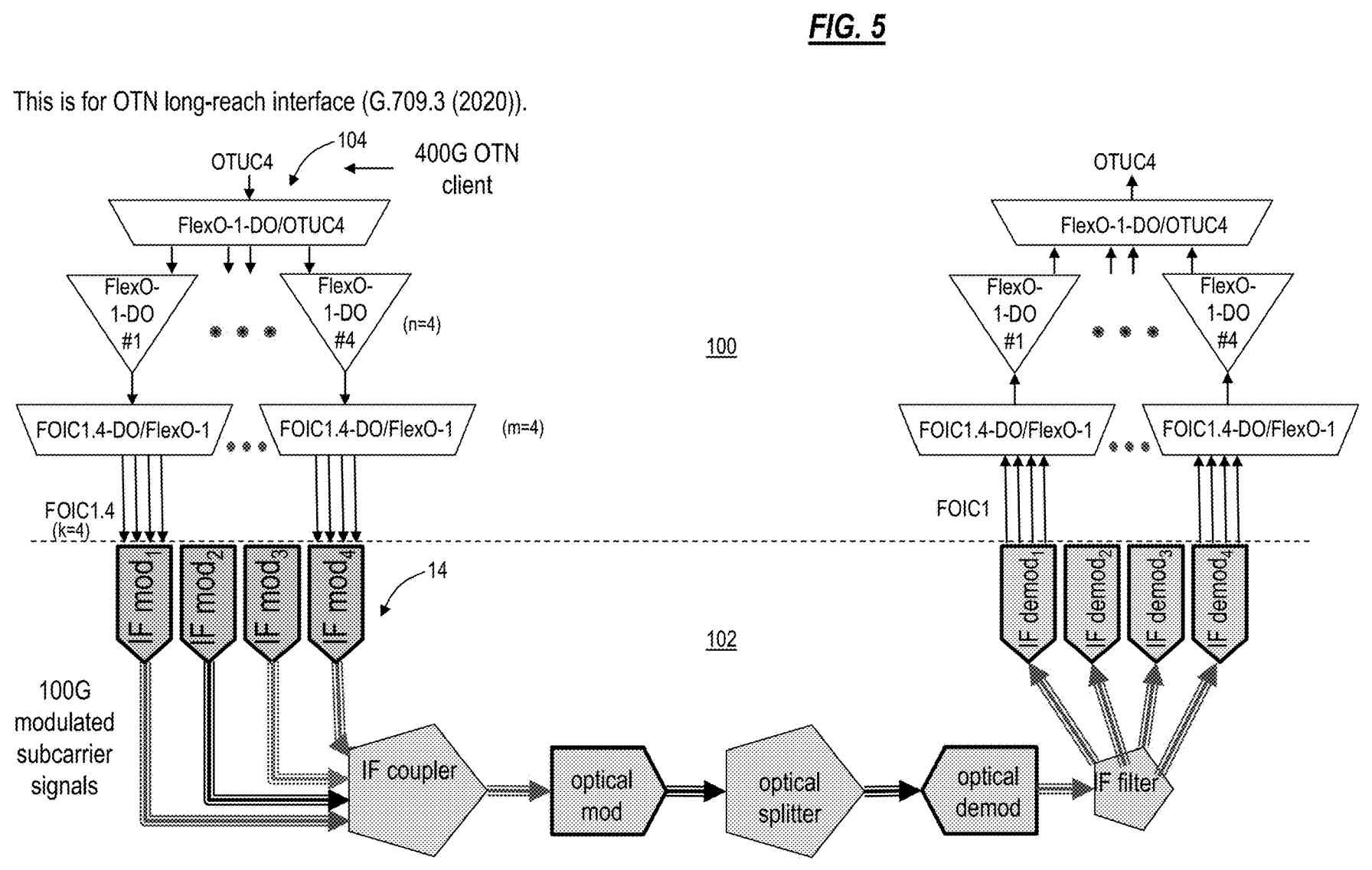

FIG. 5 is a diagram of FlexO with an example of an OTUC4 client 104 supported over four FlexO-1-DO frames, aggregated together, and sent on separate sub-carriers. Each FlexO-1-DO frame is adapted to FOIC1.4-DO lanes that are input to an Intermediate Frequency (IF) modulator 14. Each IF modulator output is supported by a sub-carrier.

In addition to OTUCn clients, a version of FlexO can support Ethernet. This is specified as FlexO-xe by ITU and ZR by OIF. Here, the same concept applies, where clients are Ethernet frames. The FlexO-xe can be supported by multiple optical signals as in FlexO-x. For this disclosure, the FlexO-xe can be supported by adaptation to multiple sub-carriers.

A variation of FlexE for bonding is to use metro transport networking (MTN) as specified in G.8312. Here the server layer of MTN is very similar to the FlexE bonding in FIG. 3. The client is the MTN Path layer which supports Ethernet clients.

In FIGS. 4 and 5, the steps are the same for the transmission from the root to a leaf or vice versa, in a point to multipoint topology. For a given leaf/ONU where bonding occurs, the same SCs are not used by other leaves/ONUs. This is also true when bonding at the root.

In addition to bonding of sub-carrier bandwidth to create a packet or TDM port with a large information rate, the management of multiple FlexO into a set of sub-carriers is important. The FlexO frame overhead has fields for managing FlexO members. This is important as service providers are interested in dynamically allocated sub-carriers to endpoints (leaves) of an optical PtMP topology.

Accordingly, the present disclosure provides concepts of FlexO/FlexE to PtMP applications. FlexO and FlexE protocols layers have some of the necessary functions to enable this application, and this disclosure also provides enhancements to the existing protocols.

Compared to clause 143 of IEEE802.3-2022, FlexE bonding over sub-carriers uses only one optical carrier which is done by modulating and combining digital inputs into a single SCM signal prior to one optical modulation step. Use of FlexO provides a TDM client rather than a packet (Ethernet) client which is useful for some applications.

FlexO and FlexE protocols can address these new PON and metro aggregation applications. There are functions built into the FlexO and FlexE protocols that can be leveraged in P2MP applications.

Group Identification (GID)/FlexO Instance Identification (IID)/FlexO Map field (MAP) group management to identify members and different groups. These are subfields in the FlexO overhead structure, see G.709.1.
Sliced signal structure
Trace
Integrity
Maintenance

8

However, for these new applications, FlexO and FlexE could be enhanced for additional functionality that is specific to PON and metro aggregation applications.

Partial survivability, i.e., we would not want to whole group to fail when a single sub-carrier is failed. For FlexO, an example of partial survivability is described in U.S. Pat. No. 10,336,614, issued Jun. 25, 2019, and entitled "Partial survivability for multi-carrier and multi-module optical interfaces," the contents of which are incorporated by reference in their entirety. With the present disclosure, the partial survivability can include allowing one or more sub-carriers to fail while the larger client signal is maintained, albeit at a lower rate (i.e., without the failed sub-carriers). This can include overhead signaling to denote the partial failure and partial survivability, and the like.

Resizing. Operations, Administration, and Maintenance (OAM) functions could be added to allow group resizing. For example, a second MAP field could be used and flipped on a given boundary to enable hitless resizing.

FCC or DSP communication channels could be extended to per sub-carrier for leaf node management.

Support for non-consecutive instance mappings

Support for separate maintenance states to facilitate service bring-up per sub-carrier/leaf.

SCM in PON

SCM is being discussed in ITU-T SG15 originally in the context of very high speed PON (beyond 50G) and in the CableLabs Coherent PON project. There is a requirement that a leaf (ONU) be able to use multiple sub-carriers for a higher aggregated rate. No details of how the aggregation mechanism has been given. There is an assumption in the CableLabs Coherent PON project that SCM bonding may be done using a technique originally described in amendment IEEE802.3ca. This can be found in IEEE802.3-2022 clause 143 which describes the use of multiple Ethernet PHYs to support one or more media access control (MAC) streams. A Multi-Channel Reconciliation Sublayer (MCRS) enables multiple MAC client streams to be supported over multiple PHYs. Each PHY would have a separate optical carrier signal.

The bonding in clause 143 of IEEE802.3-2022 is only for Ethernet and does not provide a connection-oriented circuit switched (i.e., time division multiplexed (TDM)) aggregate service and requires multiple optical carriers. Also, the MCRS is at a higher level than typically what would be visible/implemented in optical transport modems for metro aggregation. Bonding at a lower layer than the IEEE802.3 multi-channel reconciliation sublayer (MCRS) is more advantageous for transport.

Figure 6:
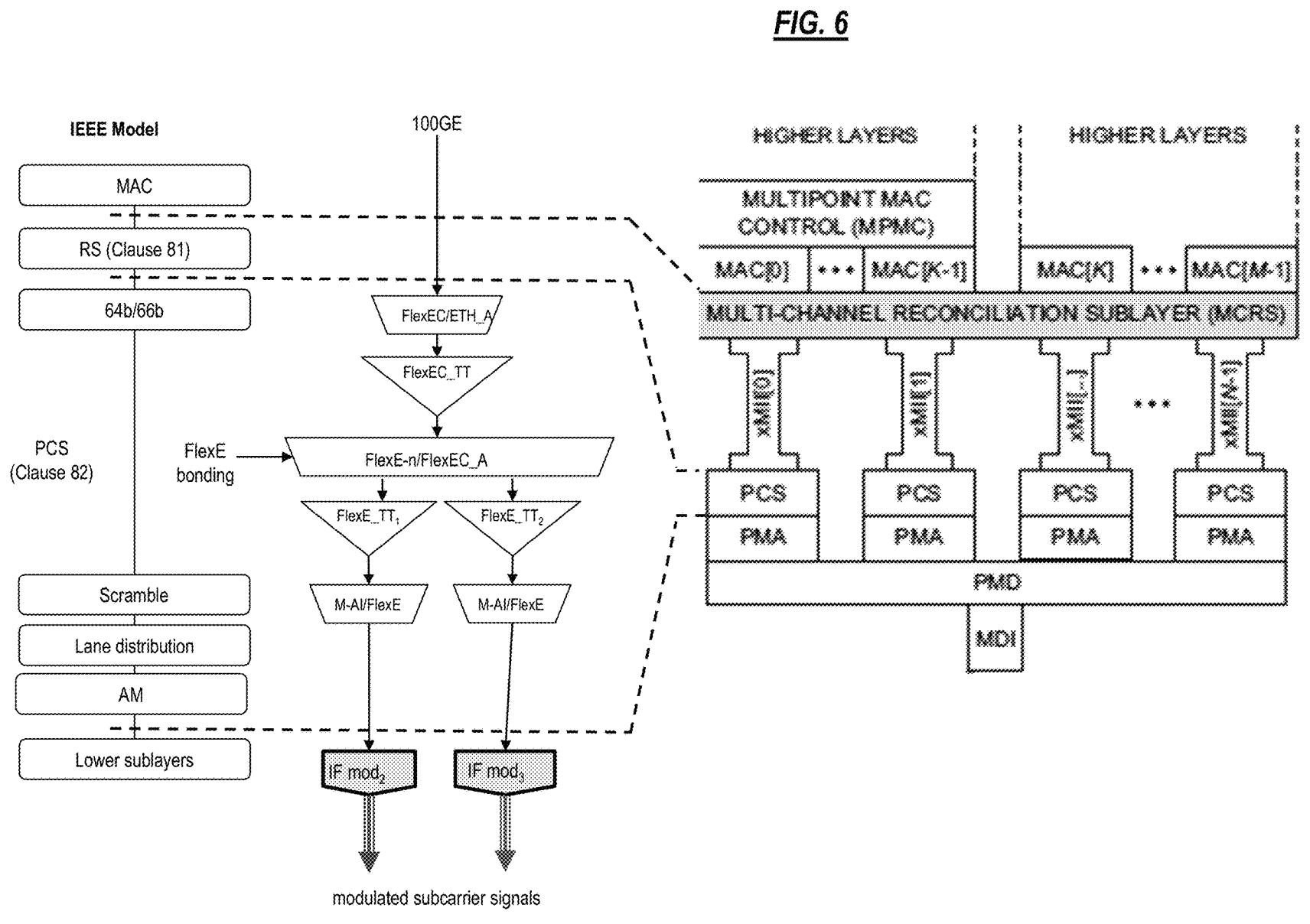

FIG. 6 is a diagram comparing bonding in clause 143 of IEEE802.3-2022 with FlexE. FlexE bonding occurs inside the IEEE 802.3 Physical Coding Sublayer (PCS) whereas MCRS is above the PCS layer.

For FlexO, bonding is also at a low level and its framing is appropriate for coherent technology.

SCM Bonding Processes

FIG. 7 is a flowchart of a transmit process 200 for bonding over sub-carrier multiplexed channels. The transmit process 200 contemplates implementation as a method having steps, via a circuit or circuitry configured to implement the steps, and via a system, apparatus, module, etc. configured to implement the steps. The transmit process 200 includes receiving a client signal (step 202), processing the client signal to form a plurality of constituent signals where the plurality of constituent signals comprise the client signal (step 204), and providing each of the plurality of constituent signals to a media layer for each of the plurality of constituent signals to be modulated on a respective sub-carrier in sub-carrier multiplexing (SCM) (step 206). Specifically, the plurality of constituent signals comprise the client signal meaning the client signal is broken into the plurality of constituent signals for SCM transmission. That is, the plurality of constituent signals are bonded together to represent the client signal.

In an embodiment, the client signal can be one or more Ethernet signals and the plurality of constituent signals can be Flexible Ethernet (FlexE) layer signals. In another embodiment, the client signal can be one or more Optical Transport Network (OTN) or Ethernet signals and the plurality of constituent signals can be Flexible OTN (FlexO) layer signals. In a further embodiment, the client signal can be one or more Ethernet signals and the plurality of constituent signals can be ZR layer signals. In yet another embodiment, the client signal can be one or more Ethernet signals and the plurality of constituent signals can be Metro Transport Network (MTN) layer signals.

The media layer can utilize copper where the plurality of constituent signals can be provided to an intermediate frequency (IF) modulator in the media layer. The media layer can also utilize fiber where the plurality of constituent signals can be provided to a transmitter in the media layer. The media layer can be a point-to-multipoint topology.

Figure 8:
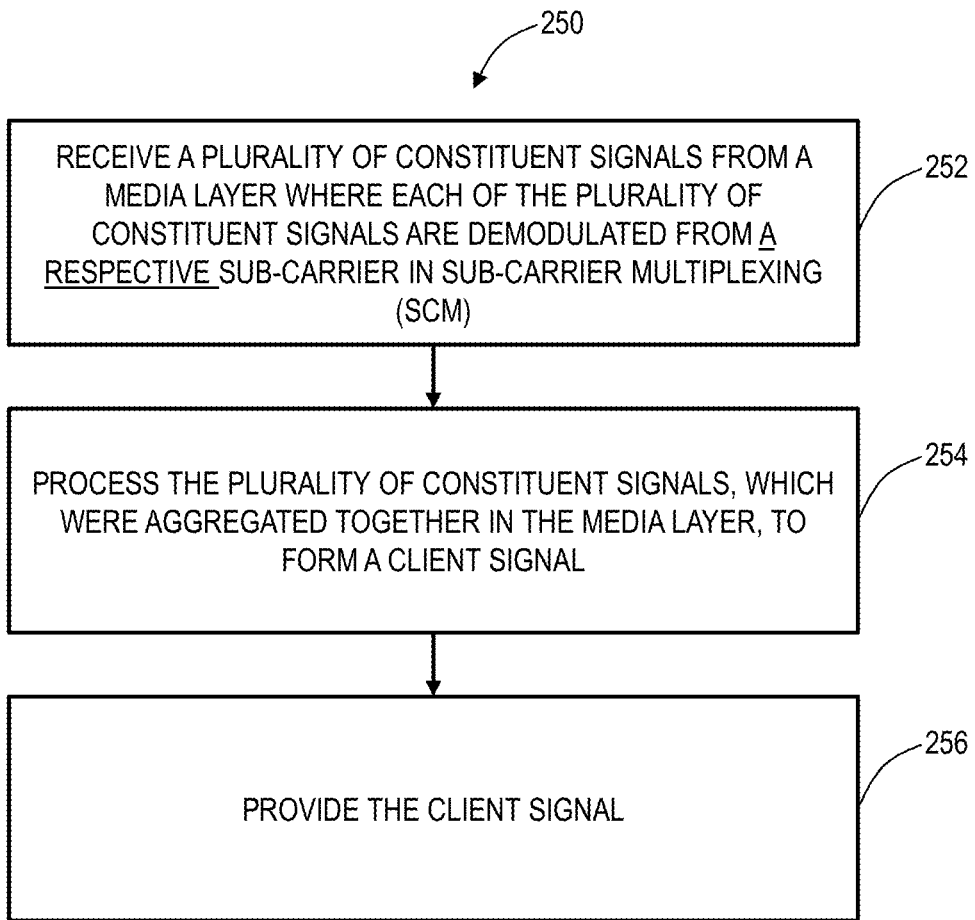
FIG. 8 is a flowchart of a receive process for bonding over sub-carrier multiplexed channels.

FIG. 8 is a flowchart of a receive process 250 for bonding over sub-carrier multiplexed channels. The receive process 250 contemplates implementation as a method having steps, via a circuit or circuitry configured to implement the steps, and via a system, apparatus, module, etc. configured to implement the steps. The receive process 250 includes receiving a plurality of constituent signals from a media layer where each of the plurality of constituent signals are demodulated from a respective sub-carrier in sub-carrier multiplexing (SCM) (step 252), processing the plurality of constituent signals, which were aggregated together in the media layer, to form a client signal (step 254), and providing the client signal (step 256).

In an embodiment, the client signal can be one or more Ethernet signals and the plurality of constituent signals can be Flexible Ethernet (FlexE) layer signals. In another embodiment, the client signal can be one or more Optical Transport Network (OTN) or Ethernet signals and the plurality of constituent signals can be Flexible OTN (FlexO) layer signals. In a further embodiment, the client signal can be one or more Ethernet signals and the plurality of constituent signals can be ZR layer signals. In yet another embodiment, the client signal can be one or more Ethernet signals and the plurality of constituent signals can be Metro Transport Network (MTN) layer signals.

The media layer can utilize copper where the plurality of constituent signals can be provided to an intermediate frequency (IF) demodulator in the media layer. The media layer can also utilize fiber where the plurality of constituent signals can received by a receiver in the media layer. The media layer can be in a point-to-multipoint topology.

In another embodiment, a sub-carrier multiplexing (SCM) system includes a digital layer including circuitry configured as a digital layer including circuitry configured to interface with a client and to interface with a media layer via a plurality of constituent signals, that together comprise the client signal; and the media layer including sub-carrier multiplexing (SCM) with each sub-carrier configured to carry one of the plurality of constituent signals.

The client signal can be one of (1) one or more Ethernet signals and the plurality of lower rate signals are Flexible Ethernet (FlexE) layer signals, (2) one or more Optical Transport Network (OTN) or Ethernet signals and the plurality of lower rate signals are Flexible OTN (FlexO) layer signals, (3) one or more Ethernet signals and the plurality of constituent signals are ZR layer signals, and (4) one or more Ethernet signals and the plurality of constituent signals are Metro Transport Network (MTN) layer signals. The media layer can utilize passive optical network (PON).

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A transmit circuit configured to:

receive a client signal, process the client signal to form a plurality of constituent signals where the plurality of constituent signals comprise the client signal, and provide each of the plurality of constituent signals to a media layer for each of the plurality of constituent signals to be modulated on a respective sub-carrier in sub-carrier multiplexing (SCM), wherein the client signal is one of (1) one or more Ethernet signals and the plurality of constituent rate signals are Flexible Ethernet (FlexE) layer signals (2) one or more Optical Transport Network (OTN) or Ethernet signals and the plurality of constituent signals are Flexible OTN (FlexO) layer signals, (3) one or more Ethernet signals and the plurality of constituent signals are ZR layer signals, and (4) one or more Ethernet signals and the plurality of constituent signals are Metro Transport Network (MTN) layer signals.

2. The transmit circuit of claim 1, wherein the media layer utilizes copper where the plurality of constituent signals are provided to an intermediate frequency (IF) modulator in the media layer.

3. The transmit circuit of claim 1, wherein the media layer utilizes fiber where the plurality of constituent signals are provided to a transmitter in the media layer.

4. The transmit circuit of claim 1, wherein the media layer is in a point-to-multipoint topology.

5. A receive circuit configured to:

receive a plurality of constituent signals from a media layer where each of the plurality of constituent signals are demodulated from a respective sub-carrier in sub-carrier multiplexing (SCM), process the plurality of constituent signals, which were aggregated together in the media layer, to form a client signal, and provide the client signal, wherein the client signal is one of (1) one or more Ethernet signals and the plurality of constituent rate signals are Flexible Ethernet (FlexE) layer signals, (2) one or more Optical Transport Network (OTN) or Ethernet signals and the plurality of constituent rate signals are Flexible OTN (FlexO) layer signals, (3) one or more Ethernet signals and the plurality of constituent signals are ZR layer signals, and (4) one or more Ethernet signals and the plurality of constituent signals are Metro Transport Network (MTN) layer signals.

6. The receive circuit of claim 5, wherein the media layer utilizes copper where the plurality of constituent signals are each received from an intermediate frequency (IF) demodulator in the media layer.

7. The receive circuit of claim 5, wherein the media layer utilizes fiber where the plurality of constituent signals are received from a receiver in the media layer.

8. The receive circuit of claim 5, wherein the media layer is in a point-to-multipoint topology.

9. A sub-carrier multiplexing (SCM) system comprising:

a digital layer including circuitry configured to interface with a client and to interface with a media layer via a plurality of constituent signals, that together comprise a client signal; and the media layer including sub-carrier multiplexing (SCM) with each sub-carrier configured to carry one of the plurality of constituent signals, wherein the media layer utilizes copper where the plurality of constituent signals are provided to an intermediate frequency (IF) modulator in the media layer.

10. The SCM system of claim 9, wherein the client signal is one of (1) one or more Ethernet signals and the plurality of constituent signals are Flexible Ethernet (FlexE) layer signals, (2) one or more Optical Transport Network (OTN) or Ethernet signals and the plurality of constituent signals are Flexible OTN (FlexO) layer signals, (3) one or more Ethernet signals and the plurality of constituent signals are ZR layer signals, and (4) one or more Ethernet signals and the plurality of constituent signals are Metro Transport Network (MTN) layer signals.

11. The SCM system of claim 9, wherein the media layer utilizes passive optical network (PON).

*   *   *   *   *